United States Patent
Asjadi

(10) Patent No.: US 8,854,477 B2
(45) Date of Patent: *Oct. 7, 2014

(54) SIGNAL EVALUATION SYSTEM AND METHOD

(75) Inventor: Gholam Hosein Asjadi, Guildford (GB)

(73) Assignee: Sony Corporation, Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 13/550,906

(22) Filed: Jul. 17, 2012

(65) Prior Publication Data

US 2013/0182124 A1    Jul. 18, 2013

(30) Foreign Application Priority Data

Aug. 12, 2011    (GB) .................................. 1113912.8

(51) Int. Cl.
*H04N 17/02* (2006.01)
*H04N 17/04* (2006.01)
*H04L 25/02* (2006.01)

(52) U.S. Cl.
CPC .......... *H04N 17/045* (2013.01); *H04L 25/0212* (2013.01)
USPC ........... 348/193; 348/180; 348/192; 348/570; 725/72

(58) Field of Classification Search
USPC ........ 348/180, 192, 193; 375/227; 455/226.2, 455/226.3
See application file for complete search history.

(56) References Cited

U.S. PATENT DOCUMENTS

| | | | | |
|---|---|---|---|---|
| 7,099,380 B1 * | 8/2006 | Feng et al. | ..................... | 375/150 |
| 7,492,707 B2 * | 2/2009 | Tanaka et al. | ................. | 370/225 |
| 2002/0051085 A1 * | 5/2002 | Lee | ................ | 348/570 |
| 2006/0203894 A1 * | 9/2006 | Ventola | ......................... | 375/148 |
| 2008/0205537 A1 * | 8/2008 | Kim et al. | ..................... | 375/267 |
| 2008/0258972 A1 * | 10/2008 | Nakajima et al. | ............. | 342/374 |
| 2009/0296861 A1 * | 12/2009 | Sampath | ....................... | 375/340 |
| 2011/0182346 A1 | 7/2011 | Park et al. | | |

OTHER PUBLICATIONS

United Kingdom Search Report issued Dec. 7, 2011 in corresponding Great Britain Application No. 1113912.8 filed on Aug. 12, 2011.
U.S. Appl. No. 13/550,047, filed Jul. 16, 2012, Asjadi.

* cited by examiner

*Primary Examiner* — Jefferey Harold
*Assistant Examiner* — Humam Satti
(74) *Attorney, Agent, or Firm* — Oblon, Spivak, McClelland, Maier & Neustadt, L.L.P.

(57) ABSTRACT

A smart antenna configuration estimator for use in a digital TV receiver comprises data input means operable to obtain an estimate of an impulse response of a channel through which the television signal has passed to the receiver, maximum finding means operable to find the maximum value of the channel impulse response, the maximum value corresponding to a main signal path, averaging means operable to calculate a mean of values of the channel impulse response comprising channel impulse response values corresponding to one or more additional signal paths, and ratio calculating means operable to calculate a quality value as the ratio of the maximum value to the mean of values of the channel impulse response.

15 Claims, 13 Drawing Sheets

| No. | RF Frequency (MHz) | DVB-T Signal | TV Payload | Coarse Setting | Fine Setting | Gain Setting | Channel Setting | Q Factor (dB) | Signal Strength (dBm) | MER (dB) |
|---|---|---|---|---|---|---|---|---|---|---|
| 1 | 538 | 2K, 16QAM | 4MUSIC ... | 3 | 1 | 3 | 14 | 47 | -61 | 10 |
| 2 | 578 | 2K, 16QAM | BBC1 ... | 3 | 2 | 1 | 15 | 37 | -66 | 7 |
| 3 | 626 | 2K, 64QAM | QVC ... | 2 | 2 | 3 | 16 | 53 | -60 | 26 |
| 4 | 634 | 2K, 16QAM | 4MUSIC ... | 0 | 2 | 1 | 17 | 52 | -61 | 24 |
| 5 | 650 | 2K, 64QAM | ITV1 ... | 2 | 2 | 3 | 18 | 53 | -36 | 24 |
| 6 | 658 | 2K, 16QAM | E4+1 ... | 2 | 1 | 2 | 19 | 49 | -63 | 23 |
| 7 | 674 | 2K, 16QAM | BBCFOUR ... | 0 | 3 | 3 | 20 | 52 | -44 | 23 |
| 8 | 706 | 2K, 16QAM | BBC1 ... | 3 | 1 | 1 | 21 | 55 | -49 | 27 |

*Figure 5*

| No. | RF Frequency (MHz) | DVB-T Signal | Average MER (dB) with Smart Configurations | Average MER (dB) With Omni-Directional Antenna | Performance Improvement (dB) |
|---|---|---|---|---|---|
| 1 | 626 | 2K, 64QAM | 19.75 | 10.85 | 9 |
| 2 | 634 | 2K, 16QAM | 17.75 | 1.45 | 16 |
| 3 | 650 | 2K, 64QAM | 17.75 | 10.45 | 7 |
| 4 | 658 | 2K, 16QAM | 14.55 | 10.75 | 4 |
| 5 | 674 | 2K, 16QAM | 17.95 | 9.15 | 9 |
| 6 | 706 | 2K, 16QAM | 23.65 | 8.75 | 15 |

*Figure 11*

SIGNAL EVALUATION SYSTEM AND METHOD

BACKGROUND OF THE INVENTION

1. Field of the Invention

The present invention relates to a signal evaluation system and method.

2. Description of the Prior Art

Successful indoor reception of terrestrial video broadcasts is frequently challenging. In the case of analogue TV broadcasts, poor reception is characterised by a graceful degradation of image quality accompanied by familiar image artefacts such as ghosting and snowy pictures.

By contrast, the advent of digital terrestrial television (DTT) has enhanced received picture quality significantly as long as the received signal quality at the receiver input remains above a certain threshold. However below this threshold, picture quality rapidly diminishes or the picture disappears completely (referred to as 'brick-wall reception performance'). Unfortunately, in the case of indoor reception with a set-top antenna, the reception conditions frequently encountered place the received signal quality below this performance threshold, resulting in a subjectively worse experience for the user than with analogue TV.

To address this problem, it is possible to use a so-called 'smart antenna'. Such a smart antenna comprises an active (steerable) directional antenna that is able to receive configuration data, in order to adapt and preferably optimise antenna reception characteristics for each received TV channel as it is selected. To facilitate adoption of this technology, the US Consumer Electronics Association (CEA) developed a standard for the configuration data known as the CEA-909 standard.

The CEA-909 standard provides for a configuration signal from a receiver to a smart antenna for a given TV channel that comprises 2 bits for coarse direction specification, 2 bits for fine direction specification, 1 bit specifying horizontal or vertical polarisation, 2 bits to specify gain level, and 7 bits specifying the channel number.

FIG. 1 illustrates how four values N of the coarse direction and the four values M of the fine direction are combined [N, M] to provide 16 directions for the steerable smart antenna. It will be appreciated that the 16 directions and the four values of N and M are a non-limiting examples.

In order to initially select a suitable configuration for a given TV channel, it is necessary to evaluate a signal reception for some if not all possible permutations of configurations available. This can be a lengthy process. The evaluation is typically based upon a combination of received signal strength, and signal quality.

A signal strength of a received signal may be estimated for example from a signal to noise ratio, which may in turn for example be determined from a deviation of signals from a target symbol in a constellation of a modulation scheme in use (in a similar manner to modulation error ratio). Other indicators of the signal strength include a radio frequency (RF) signal strength or the gain value of an automatic gain control system.

Meanwhile, indicators of signal quality include metrics such as the bit error rate (BER) of the demodulated signal. Notably, a threshold bit error rate for acceptable viewing of a TV channel may be very low, requiring a considerable period of time to pass before a statistically significant estimate of BER can be obtained. In conjunction with a need to evaluate a large number of smart antenna permutations, this can undesirably prolong the process of configuring or re-configuring a smart antenna.

A combination of signal strength and/or signal quality indicators used by the designer of a digital receiver thus determines a responsiveness of a receiver and also a quality of the received signal, as a configuration of an antenna will be selected to maximise one or both of such indicators.

Consequently it is desirable to improve such indicators where possible to improve in turn both the responsiveness of the digital receiver when configuring the smart antenna, and the resulting quality of the received signal.

SUMMARY OF THE INVENTION

In a first aspect, a method of evaluating signal reception is provided as per claim 1.

In another aspect, a smart antenna configuration estimator is provided as per claim 11.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 5 is a table of reception and performance values for eight DVB-T channels.

FIG. 11 is a table of reception and performance values for six DVB-T channels.

DESCRIPTION OF THE PREFERRED EMBODIMENTS

A signal evaluation system and method are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

Figure 2:
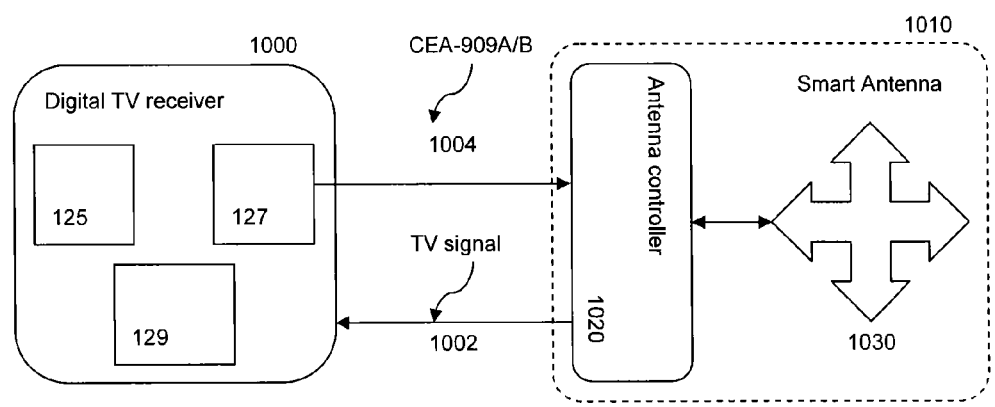
FIG. 2 is a schematic diagram of a signal evaluation system according to an embodiment of the present invention.

Referring now to FIG. 2, a digital TV receiver 1000 is operable to receive terrestrial digital TV signals such as but not limited to those adhering to the DVB-T, DVB-T2 and/or ISDB-T standards. The receiver obtains these signals typically via a coaxial cable 1002 from a set-top smart antenna 1010.

The smart antenna 1010 comprises an antenna controller 1020 and a steerable antenna 1030, such as for example an antenna array steerable using phase delays set by the antenna controller.

To set the steering direction and otherwise configure the smart antenna, the digital TV receiver then sends configuration data according to the CEA-909 standard to the smart antenna using a control cable 1004.

For the digital TV receiver, an initial process of evaluating and selecting a configuration of the smart antenna breaks down into three parts.

Firstly, for a given RF channel, for each configuration of the smart antenna, monitor an indicator of signal strength and/or signal quality as described previously. Secondly, select the configuration of the smart antenna that generates the best signal strength and/or signal quality, or some other criterion based on such measurements. Thirdly, store this configuration in association with the channel number, and transmit it to the smart antenna as required using the CEA-909 standard.

In a conventional system, an evaluation of a signal strength such as an RF signal strength may be used. However, for multi-path conditions this has the disadvantage that it cannot properly distinguish the distribution of the signal strength over multiple signal paths and hence does not properly distinguish between good and poor multi-path reception conditions. Subsequent techniques to resolve multi-path signal conditions in the receiver (for example with reference to the received symbol and the symbol constellation) tend to be complex and slow.

Figure 3:
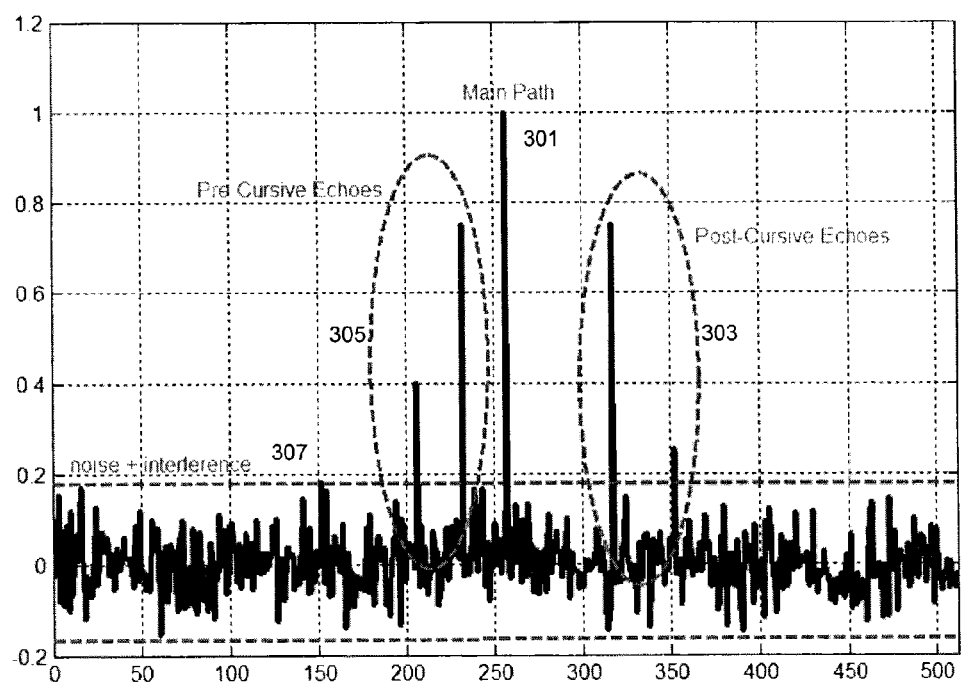
FIG. 3 is a schematic diagram of a channel impulse response (CIR) from a digital TV receiver receiving a multipath signal.

Referring now also to FIG. 3, in an embodiment of the present invention it has been appreciated that conventional digital TV receivers will perform channel estimation in order to equalize a received signal that is suffering from multi-path or other channel defects. As part of this process the digital TV receiver will generate a channel impulse response (CIR) or a frequency response from which the CIR can be derived. For example, in an orthogonal frequency division multiplexing (OFDM) system, pilot signals are formatted on certain subcarriers of an OFDM symbol such that when performing an inverse FFT, an estimate of the CIR can be obtained. Consequently the CIR can be obtained from an existing channel estimation already being performed for channel equalization (i.e. for purposes other than smart antenna configuration, such as normal processing in the receiver chain).

FIG. 3 shows a typical CIR for an RF channel in multi-path conditions, with a normalized response on the y-axis and time (in milliseconds) on the x-axis. Within the CIR, samples of the response for the signal from the main path 301, as well as responses for longer and shorter paths 303, 305, can be discerned. In addition the response to noise and other interference 307 can be seen. The response values have been normalized to the main path response.

Consequently in an embodiment of the present invention, a quality indicator or Q-factor is derived as the ratio of a response for a main signal path (or, more generally, the peak sample in the CIR) to the mean of the remaining response, including the response for signals from other paths.

$$\text{Thus, } Q = \text{Max(CIR)}/\text{Mean(CIR)} \quad \text{(Equation 1)}$$

Variants where the maximum value is or is not excluded from the estimation of the mean (biased or unbiased mean) can both be considered equivalent, although in some embodiments the biased mean is preferable.

Thus notably this Q-factor does not quantify a signal to noise ratio, but rather quantifies the ratio between a main signal path (presumed to correspond to the peak sample in the CIR), and the additional signal paths and other remaining responses of a channel impulse response. Hence the Q-factor better serves to distinguish the distribution of the signal strength over multiple signal paths since, for the same overall RF signal strength, the Q-factor increases when more signal strength is concentrated in the main path.

As a result, advantageously it is able to better discriminate smart antenna configurations that are directed to better multipath conditions. By way of example, reception of a terrestrial digital TV broadcast by steering the antenna to [0,0] may result in receiving three signal paths of equal strength and overall strength N. Meanwhile, steering the antenna to [0,1] may result in receiving three signal paths where a main signal path was stronger than before and the other signal paths were weaker, but sum to an overall strength N−1. In this case, the systems of the prior art may select the sub-optimal direction [0, 0], whereas the above described Q-factor will select position [0,1] as a better configuration.

Taking instead the CIR power in dB, then the Q-factor can also be equivalently expressed in dB as follows:

$$Q \text{ dB} = \text{CIR}_{max} \text{ dB} - \text{CIR}_{mean} \text{ dB}. \quad \text{(Equation 2)}$$

Figure 4A:
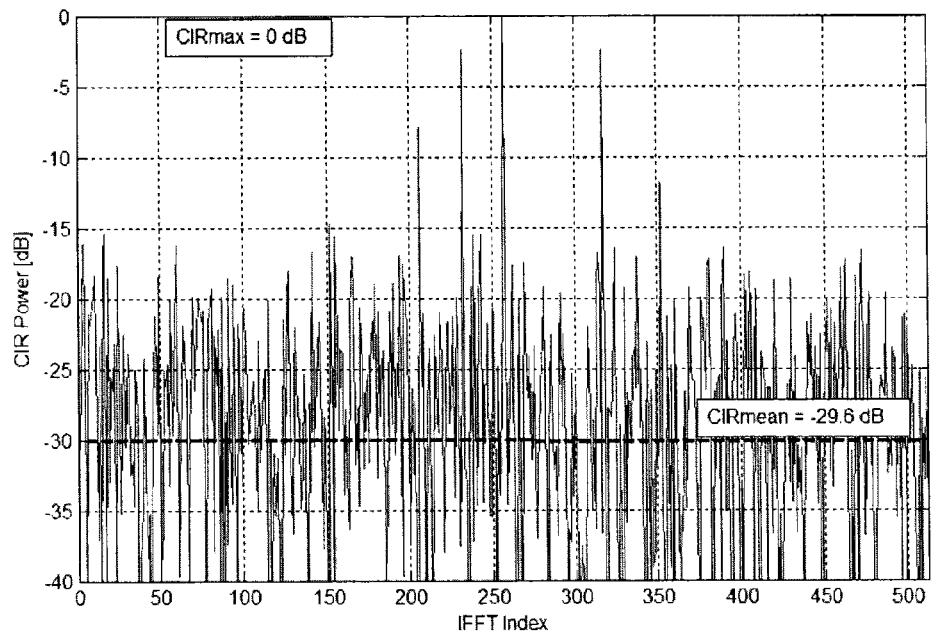
FIG. 4A is a schematic diagram of CIR power for a first smart antenna direction.
Figure 4B:
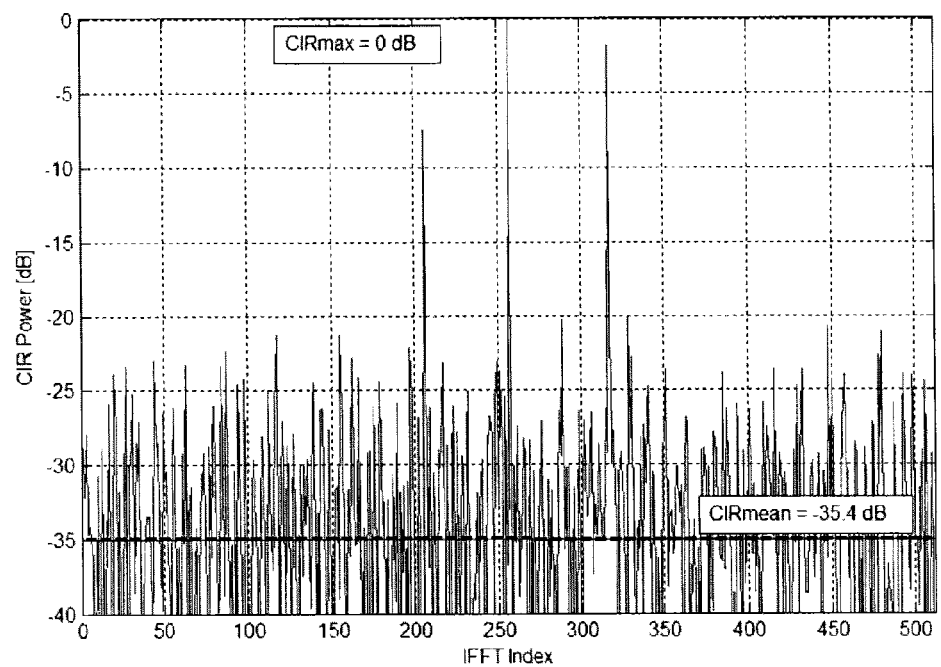
FIG. 4B is a schematic diagram of CIR power for a second smart antenna direction.

FIGS. 4A and 4B illustrate the Q-factor in dB for CIR power at two different smart antenna configurations. Here, normalizing the power to the maximum response makes $\text{CIR}_{max}$ 0 dB in each case. In this example, by configuring the antenna to point in a new direction in FIG. 4B, the Q-factor is improved by nearly 6 dB.

FIG. 5 shows a table listing the smart antenna configuration settings for receiving eight DVB-T channels obtained during a test of a digital TV receiver and smart antenna operating in accordance with an embodiment of the present invention. Two of the channels (channels 1 and 2) are weaker, duplicate channels equivalent to channels 4 and 8. Notably, whilst the signal strength for channels 1 and 4 are the same, their evaluated Q-Factors differ by 5 dB, reflecting the different multipath conditions for each signal. Hence whilst conventional signal strength measures would not differentiate these equivalent channels, the Q factor clearly identifies channel 4 as preferable to channel 1. For the main transmission (from the nearest transmitter), channels 3-8 all also show good signal quality based on the slower estimation produced by evaluating the modulation error ratio.

Figure 6:
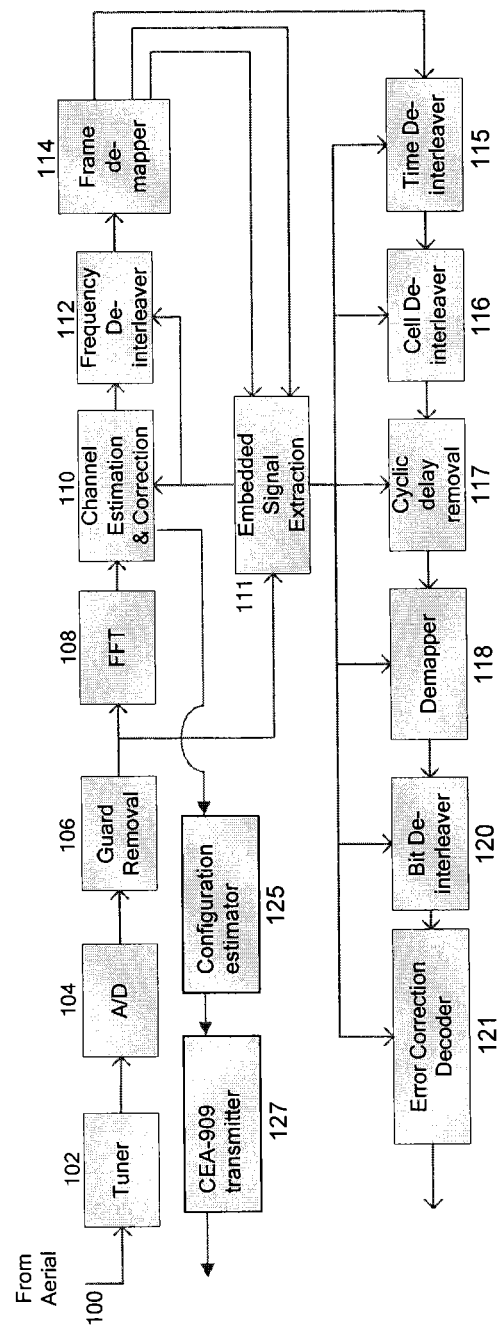
FIG. 6 is a schematic diagram of a digital TV receiver reception chain according to an embodiment of the present invention.

Referring now to FIG. 6, a non-limiting example of a digital TV receiver processing chain according to an embodiment of the present invention is shown.

An orthogonal frequency division multiplexed (OFDM) signal is received by an antenna 100 and detected by a tuner 102 before being converted into digital form by an analogue-to-digital converter 104. A guard interval removal processor 106 removes a guard interval from a received OFDM symbol, before modulation symbols representing the data are recovered from each received OFDM symbol using a Fast Fourier Transform (FFT) processor 108 in combination with a channel estimator and corrector 110 and an embedded-signalling extraction (decoding) unit 111. The modulation symbols are fed to a frequency de-interleaver 112, which performs a reverse mapping between the modulation symbols and the OFDM symbol sub-carriers to form a stream of modulation symbols from each of the OFDM symbols. A frame de-mapper 114 then separates the modulation symbols transmitted in different frames of the time division multiplexed structure of the OFDM transmission interface into logical channels, which are then time de-interleaved by a time de-interleaver 115 and then a further deinterleaver called a cell deinterleaver 116. A cyclic delay removal unit 117 then removes a cyclic shift if introduced into the data at the transmitter. The demodulated data is then recovered from a de-mapper 118 from the modulation symbols and to produce a bit stream for each channel. A bit de-interleaver 120 then reverses any bit interleaving in the signal. Finally an error correction decoder 121 is arranged to correct errors and recovers an estimate of the source data.

In addition to the above conventional elements of the receiver, FIG. 6 also shows a configuration estimator 125 that receives the CIR or CIR power for the current channel as described previously, and which is operable to estimate and select a preferred smart antenna configuration. This configuration is then formatted and transmitted to the smart antenna (for example via USB cable 1004) by a CEA-909 compliant transmitter 127. Typically a CPU (not shown) of the digital TV receiver is operable under software instruction to act as the configuration estimator. Alternatively, where the configuration estimator comprises dedicated hardware, it will be appreciated that the CEA-909 compliant transmitter may be incorporated within the configuration estimator. Other arrangements of hardware and software will be apparent to the skilled person in the art.

It will be appreciated that more generally any suitable conventional digital TV receiver that as a consequence of its normal reception processing generates a CIR or CIR power or data from which they may be derived (for example during channel estimation) may be adapted to comprise a configuration estimator and CEA-909 compliant transmitter in a similar manner to that described above.

Figure 7:
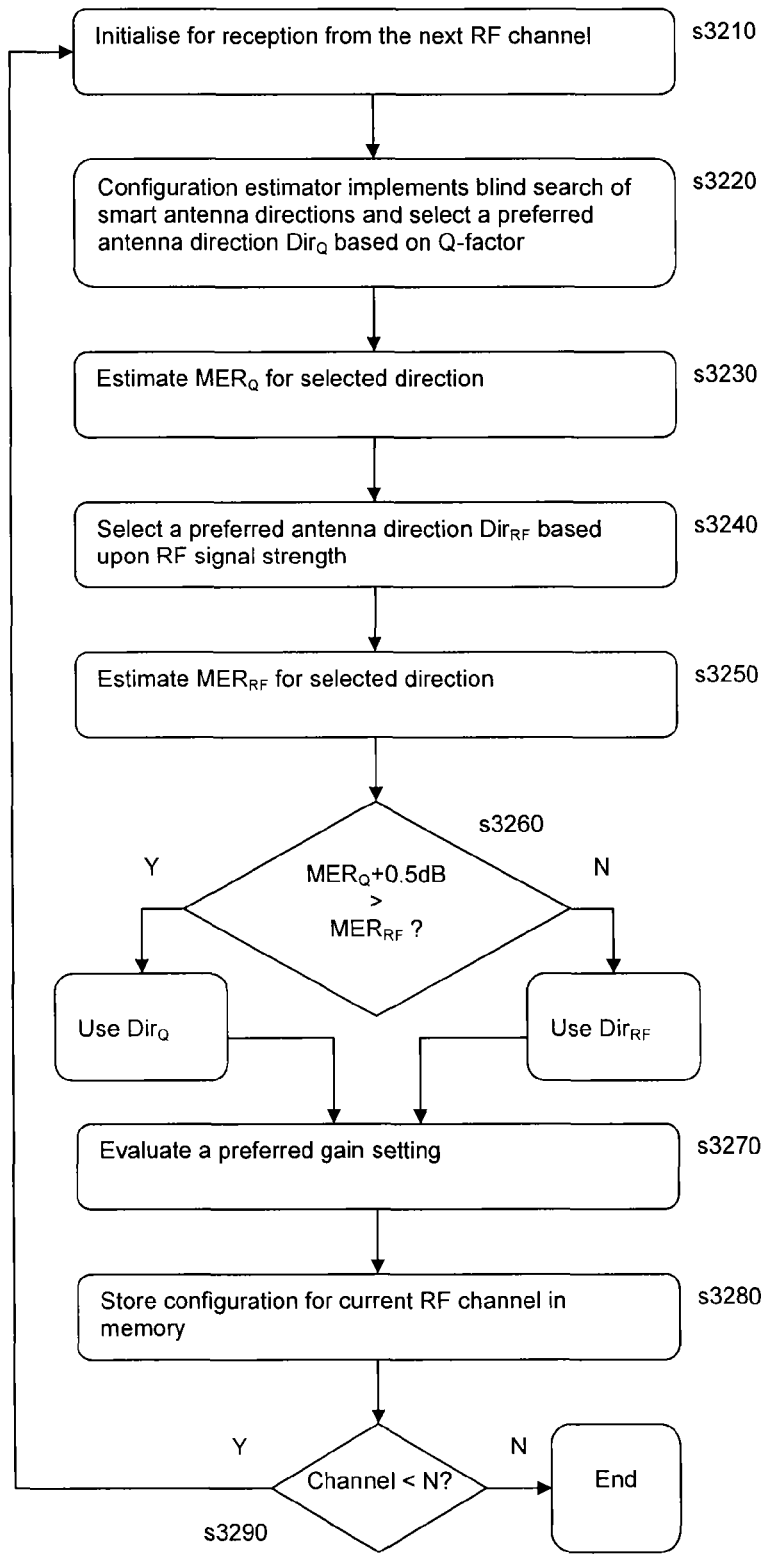
FIG. 7 is a flow diagram of a scanning process to initially configure a smart antenna, in accordance with an embodiment of the present invention.

Referring now to FIG. 7, in an embodiment of the present invention, the initial scanning process conducted by such a digital TV receiver comprises the following steps.

In a first step s3210, the digital TV receiver is initialized for reception from the next of N RF channels to scan, starting with the first channel in the sequence. If required, any initial handshaking process with the smart antenna is also performed.

In a second step s3220, the configuration estimator implements a so-called blind search (see reference to FIG. 8 below) to estimate the Q-value for some or preferably all of the directions available to the smart antenna. Optionally this blind search is performed first at the lowest of four gain settings available to the smart antenna under CEA-909. The result of the blind search is a selected direction $\text{Dir}_Q$ for the smart antenna corresponding to the largest detected Q-value.

The following four optional steps provide a graceful fall-back position for the digital TV receiver in the event that there is an unanticipated problem with the Q-factor estimation. For example, an initial blind search may be performed omitting these steps in order to obtain a quick set of results, and then the search process may be performed again using these optional steps as a background activity at a subsequent time.

Optionally, in a third step s3230, a corresponding modulation error detection measurement ($\text{MER}_Q$) can be taken for the selected antenna direction. Further optionally, the Q-factor for this direction ($Q_Q$) can also be re-estimated at this point to provide a closer correspondence of RF conditions for these two measurements.

Optionally, in a fourth step s3240, a direction $\text{Dir}_{RF}$ for the smart antenna may then be selected based upon the highest RF signal strength (for example as measured in parallel during step s3220 above).

It will be appreciated that this step may form part of the blind search of step s3220, so that both sets of selections can be made in parallel without needing to steer the smart antenna though each position twice. In this case step s3230 may occur after step s3240.

Optionally, in a fifth step s3250, a corresponding modulation error detection measurement ($\text{MER}_{RF}$) can be taken for this second selected antenna direction. Further optionally, the Q-factor for this direction ($Q_{RF}$) can also be re-estimated.

Optionally, in a sixth step s3260, the configuration estimator compares $\text{MER}_Q$ to $\text{MER}_{RF}$, and $\text{Dir}_Q$ is finally selected if $\text{MER}_Q+0.5>\text{MER}_{RF}$ (where the MER values are in dB); otherwise, $\text{Dir}_{RF}$ is finally selected. That is to say, there is a 0.5 dB bias in favour of choosing the Q-Factor configuration selection. Hence the direction based upon the Q-factor estimate is selected unless it appears to significantly (e.g. by 0.5 dB) underperform with respect to the RF signal strength estimate. It will be appreciated that this bias value is non-limiting and may be empirically determined by the skilled person for a particular transmission scheme, or may be omitted. It will also be appreciated that some common reception performance metric other than MER may be used, such as BER. Similarly, an alternative measure equivalent to RF signal strength may be used. In addition to selecting the direction in this way, further optionally the corresponding re-estimated Q-Factor ($Q_{RF}$ or $Q_Q$) may be selected as the Q-factor for this channel.

Given a selected antenna direction $\text{Dir}_Q$ or optionally $\text{Dir}_{RF}$, then in a seventh step s3270, a preferred gain setting is evaluated (see reference to FIG. 9 below) and the configuration of the smart antenna for the present channel is updated accordingly.

In a eighth step s3280, the configuration for the current channel is stored in a memory (not shown) of the digital TV receiver. The configuration typically includes but is not limited to:
  RF channel frequency;
  Channel number;
  Coarse direction setting;
  Fine direction setting;
  Gain setting; and
  Polarity.
For example, one or more of the following may also be included:
  The associated Q-Factor value (optionally $Q_{RF}$ or $Q_Q$ as applicable);
  The associated RF signal strength; and
  MER obtained during evaluation (optionally $\text{MER}_{RF}$ or $\text{MER}_Q$ as applicable).
Other values that may be stored in this manner will be apparent to the person skilled in the art.

Finally, in a ninth step s3290, the evaluation repeats for the next channel until all N RF channels are scanned. It will be appreciated that various exit conditions may be considered as optional steps in the above process, such as for example to mark a channel as empty and move to the next when no resolvable signal is detected for any antenna direction and optionally also for any gain level.

Figure 8:
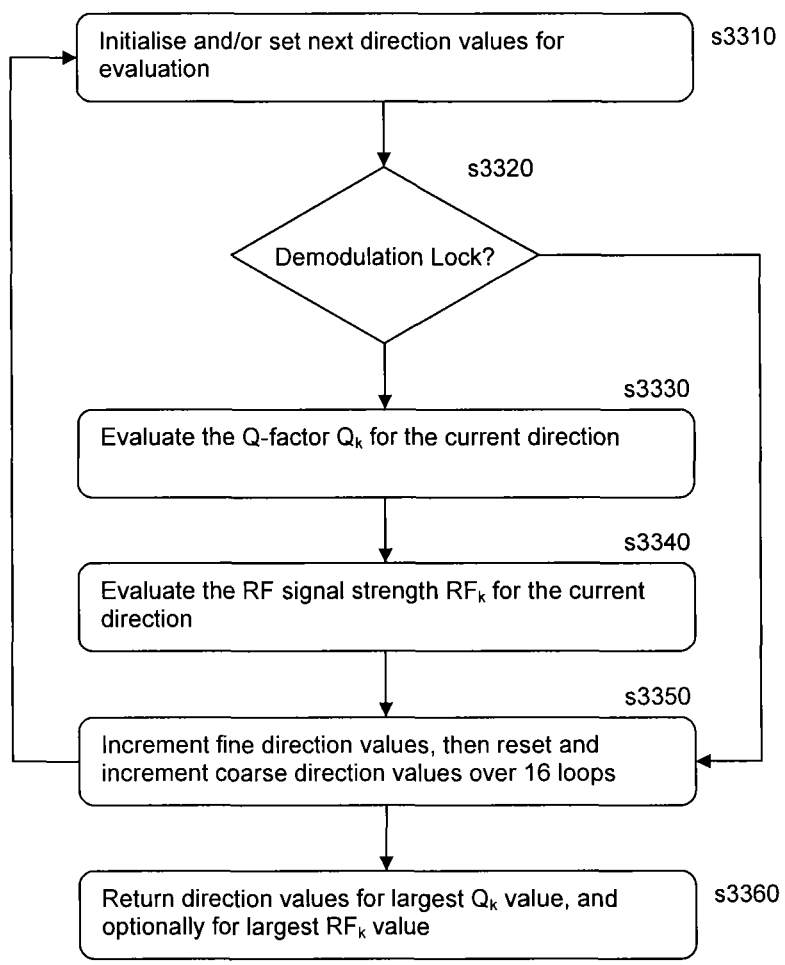
FIG. 8 is a flow diagram of a so-called blind search process used when initially configuring a smart antenna, in accordance with an embodiment of the present invention.

Referring now to FIG. 8, the so-called blind search conducted by the configuration estimator comprises the following steps.

In a first step s3310, the next direction smart antenna values in the CEA-909 format [coarse, fine] are set. Initially these may be set to direction [0, 0] (see FIG. 1). Other configuration variables may also be initialized for example, with Gain=0 and a default polarisation setting (e.g. horizontal). These configuration settings are then sent to the smart antenna. In addition, a configuration counter k is initialized to k=0.

Optionally in a second step s3320, the digital TV receiver performs a simple tuning operation to detect if a demodulation lock can be achieved for the current configuration. If not then optionally the process can skip to the fifth step below.

In a third step, s3330, the configuration estimator evaluates the Q-factor $Q_k$ for the current smart antenna configuration (see reference to FIG. 10 below).

In an optional fourth step s3340, the configuration estimator evaluates the RF signal strength $RF_k$ for the current smart antenna configuration. It will be appreciated with reference to FIG. 6 that any suitable data link to obtain the RF signal strength value from elsewhere in the digital TV receiver can be provided.

Figure 1:
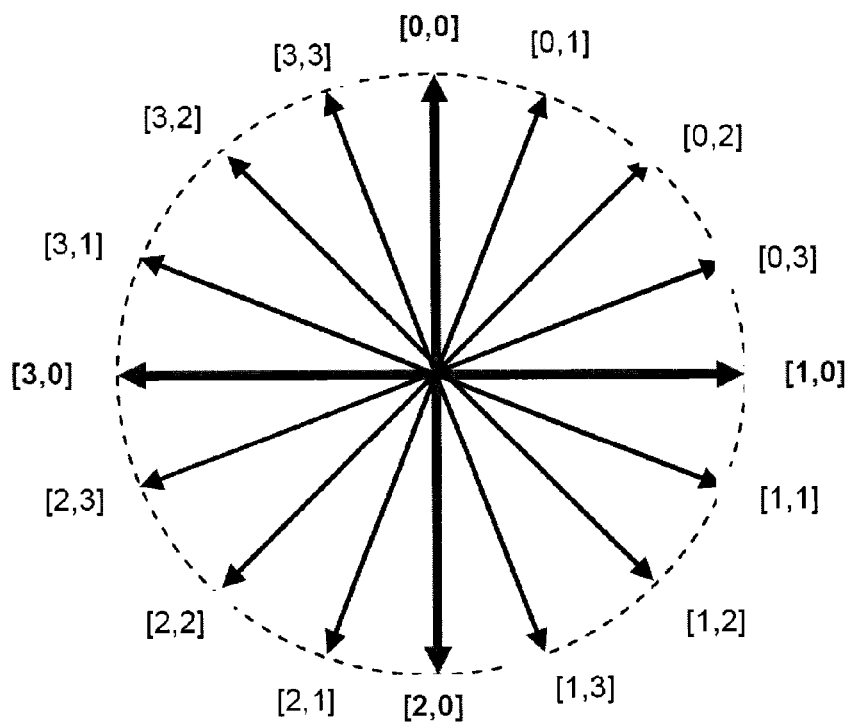
FIG. 1 is a schematic diagram of the reception directions available to a CEA-909 compliant smart antenna.

In a fifth step s3350, the CEA-909 direction values are incremented in a nested loop (fine, then coarse) for respective values 0, 1, 2, 3, to generate in turn the 16 combinations illustrated in FIG. 1. For each iteration, at least the first and third steps and optionally the second and fourth steps above are then repeated with the current direction values. In addition, for each iteration the configuration counter k is also incremented.

In a sixth step s3360, after direction [3, 3] has been evaluated (in the above example) the configuration estimator evaluates $Max[Q_k (0, \ldots k \ldots, 15)]=Q_{MAX}$ and returns the corresponding coarse and fine direction settings for use as the selected direction $Dir_Q$ in the scanning process of FIG. 7. Optionally the configuration estimator also returns $Q_{MAX}$.

Optionally as part of this step the configuration estimator also evaluates $Max[RF_k (0, \ldots k \ldots, 15)]=RF_{MAX}$ and returns the corresponding coarse and fine direction settings for use as the selected direction $Dir_{RF}$ in the scanning process of FIG. 7. Optionally the configuration estimator also returns $RF_{MAX}$.

Figure 9:
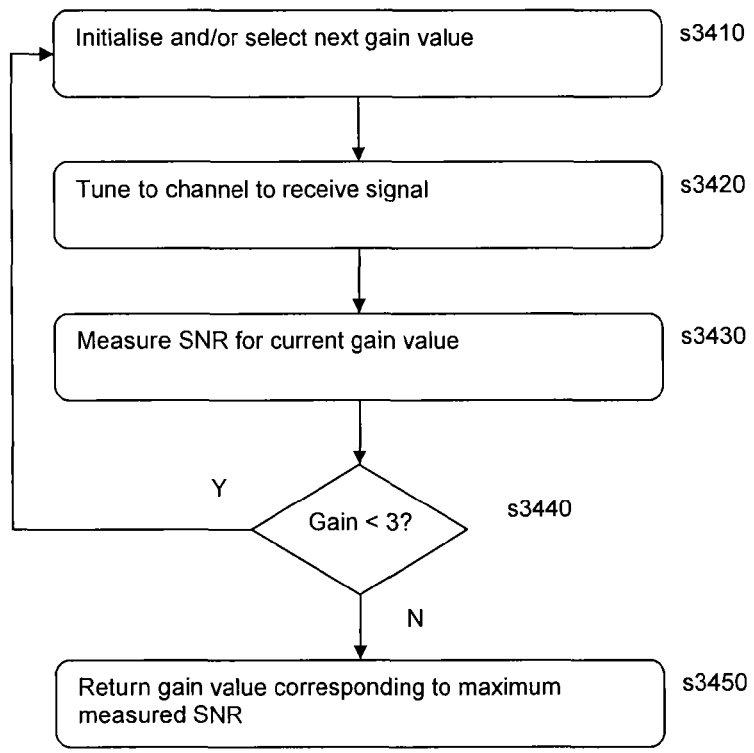
FIG. 9 is a flow diagram of a gain evaluation process used when initially configuring a smart antenna, in accordance with an embodiment of the present invention.

Referring now to FIG. 9, evaluation of the preferred gain setting by the configuration estimator comprises the following steps.

In a first step s3410, the next smart antenna direction values in the CEA-909 format [coarse, fine] are set for the selected direction $Dir_Q$ or optionally $Dir_{RF}$ (see previously herein), and the gain is set to the lowest of four settings (0, 1, 2, 3) available in CEA-909. These configuration settings are then sent to the smart antenna. In addition, a configuration counter k is initialized to k=0.

In an optional second step s3420, the digital TV receiver performs a simple tuning operation. It is assumed here that a demodulation lock is achieved for the selected direction, but of course this condition can be explicitly checked for and if so, where no lock is achieved then the current gain value can be bypassed.

In a third step s3430, the signal to noise ratio $SNR_k$ for the current configuration is recorded. Notably SNR scales with gain for the same multi-path conditions. Therefore as the smart antenna is not changing direction during evaluation of the preferred gain, SNR is a convenient metric for performance in these circumstances.

In a fourth step s3440, the gain value is incremented and the above steps are repeated as appropriate until $SNR_k$ for k=3 (in the present example) has been evaluated.

In a fifth step the configuration estimator evaluates $Max[SNR_k (0, \ldots k \ldots, 3)]=SNR_{MAX}$ and returns the corresponding gain parameter value (0, 1, 2 or 3) to the scanning process of FIG. 7 described previously.

Figure 10:
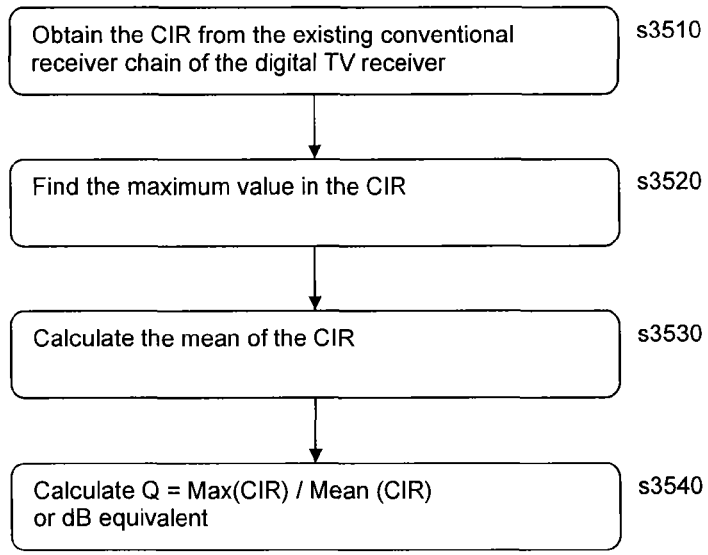
FIG. 10 is a flow diagram of a quality factor evaluation process in accordance with an embodiment of the present invention.

Referring now to FIG. 10, as described previously, in an embodiment of the present invention, evaluation of the Q-factor by the configuration estimator comprises the following steps.

In a first step s3510, the channel impulse response is obtained from the existing conventional receiver chain of the digital TV receiver, such as for example from the channel estimator 110. Preferably the CIR data is directly available, but alternatively the data from the receiver chain may require processing; for example if only a frequency impulse response is available in the receiver chain then the configuration estimator may perform an inverse FFT to obtain the CIR. The CIR may also take the form of CIR power in dB.

In a second step s3520, the maximum value in the CIR is found. This is assumed to be caused by the main signal path.

In a third step s3530, the mean of the CIR, including sample values corresponding to additional signal paths, is calculated. As noted previously, optionally calculation of the mean can exclude the maximum value found in the previous step.

In a fourth step s3540, the Q-factor is calculated in accordance with equation 1 or equation 2 above as the ratio of the maximum value of the channel input response to the mean value of the channel input response, where the mean can be biased or unbiased.

Hence the scanning function of FIG. 7 is able to detect a set of preferred configuration variables for each channel on the digital TV receiver, by evaluating the best smart antenna direction according to the measured Q value and subsequently the best gain value. Optionally this can be conducted in parallel with another measurement scheme (such as one based on RF signal strength) to provide a failsafe.

In this way, the initial selection of smart antenna configurations for terrestrial digital TV signals in multi-path reception conditions can be improved upon. Moreover, compared to performance averaging methods such as MER or BER, the instantaneous (i.e. per data frame) nature of CIR allows for a much faster initial setup than systems using such methods.

Referring to FIG. 11, this shows a table comparing the reception performance for six DVB-T channels (corresponding to channels 3-8 in FIG. 5) for a digital TV receiver first using a smart antenna configured according to an embodiment of the present invention and secondly using a conventional omni-directional antenna. The performance for both scenarios is identically measured using MER.

As can be seen, the system configured according to an embodiment of the present invention consistently outperforms the omni-directional antenna, with an average performance improvement over all six RF channels of 10 dB. Notably, this improvement meant that all six channels were viewable using the smart antenna, whilst none were viewable using the omni-directional antenna.

It will be appreciated that the multi-path conditions that the Q-factor measurement can distinguish for different smart antenna directions may not be fixed. That is to say, the multiple transmission paths between transmitter and receiver may change over time. In the long term, this may occur due to seasonal variations in atmospheric conditions and ground conditions, urban construction, or refurnishing of the room in which the smart antenna is located. In the shorter term, transmission paths may also be affected by where people sit in a room, and of course by the smart antenna being knocked or deliberately moved.

Consequently it is desirable that the configuration settings selected for the smart antenna for a particular channel are re-evaluated periodically (hereafter 'tracked'). However, unlike during the initial setup process, subsequently the user of the TV will expect to be able to watch their desired channel when they turn the TV on.

To track the evolution of multi-path conditions and where necessary reconfigure the smart antenna settings whilst mitigating the impact on current TV viewing, in an embodiment of the present invention, it is assumed that the directions immediately adjacent to a current direction of the smart antenna are likely to also provide acceptable viewing conditions. Thus for example, if the smart antenna is currently set to direction [0, 0], then it is assumed that directions [3, 3] and [0, 1] could be tested without significantly affecting the user's ability to watch the channel.

It will be appreciated that such testing may be triggered by one or more events. For example testing may be periodic (for example, hourly or daily) or may be user-driven (for example when switching to a channel or by selection from a menu) or scheduled (for example to occur during a period prior to a scheduled recording of a programme on a channel), or may be measurement driven (for example when an ongoing MER or BER measurement drops below a predetermined absolute or relative threshold). Optionally a timer is provided to prevent additional testing in response to a subsequent event within a minimum subsequent period. For simplicity of explanation, any of the above triggers may be referred to as 'events'.

Conversely, direction testing may optionally be prevented when a measurement such as MER or BER indicates that the current reception is already very good (e.g. above a first predetermined threshold) and that a change is not necessary, or counter intuitively when MER or BER measures indicate that current reception is bad (e.g. below a second predetermined threshold) and only just adequate to display the signal, on the grounds that changing direction may make the reception worse and pass the signal quality through the 'brick wall' of reception performance noted previously, thereby severely impacting the user's viewing of a channel.

In addition to changing direction, it is also possible to test whether a change of gain would improve the signal to noise ratio. Again, the gain level or levels adjacent to the current gain level can be tested. Again, one or more similar triggering events can be used. In the case where the event is a periodic trigger, optionally this can be more frequent than for the directional test.

Figure 12:
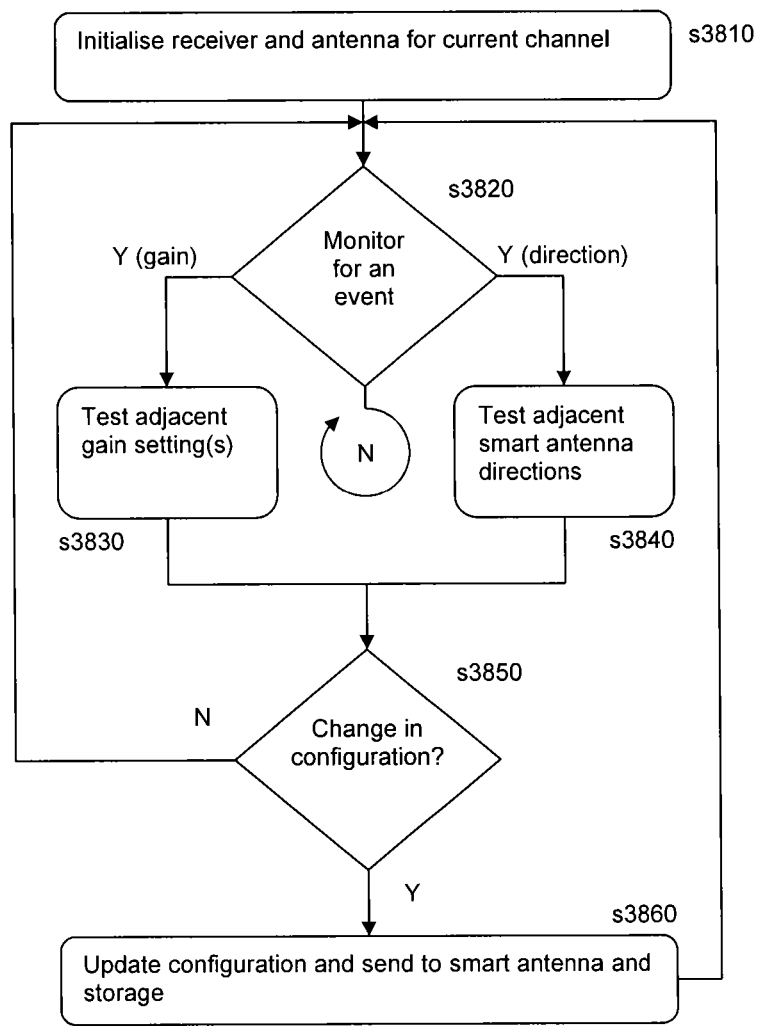
FIG. 12 is a flow diagram of a configuration tracking process in accordance with an embodiment of the present invention.

Consequently, referring now to FIG. 12, a configuration tracking process in accordance with an embodiment of the present invention comprises the following steps.

In a first step s3810, the digital TV receiver is initialized for reception on the current channel (either the channel selected by the receiver at start-up, or a user-selected channel). As part of an initialization process, the stored smart antenna configurations for a selected channel are used to set up the smart antenna.

In a second step s3820, an event monitor 129 monitors whether a triggering event has occurred that would initiate a test of the current gain setting and/or a testing of the current direction setting of the smart antenna. As described above, the event may be a periodic one (managed by one or more timers in the event monitor), or may be a user-driven one, or a scheduled one, or a response to a measurement. The event monitor function may be implemented by a CPU of the digital TV receiver.

In a third step s3830, where a detected event is to trigger a gain test (for example when a periodic gain test timer resets), then a gain test is implemented (see reference to FIG. 13 below).

In a fourth step s3850, where a detected event is to trigger a direction test (for example when a periodic direction test timer resets), then a direction test is implemented (see reference to FIGS. 14A and 14B below).

In a fifth step s3850, The system checks whether the gain or the direction should change as a result of their respective test, and if so in a sixth step s3860 the smart antenna configuration is updated and sent to the antenna, and is also stored by the digital TV receiver in memory.

The testing system then loops back to monitoring step 3820.

It will be appreciated that where a gain or direction test reveals that the gain or direction should not change, then the smart antenna is re-configured back to the existing gain or direction setting afterwards. Hence in an embodiment of the present invention the fifth step s3850 is omitted whilst the sixth step s3860 is still implemented. This has the effect of reverting the smart antenna back to the current setting if the current setting remains the best after testing. Optionally in this case the step of re-storing the same setting can be bypassed as being redundant.

It will be appreciated that an event may trigger a gain test, a direction test, or both tests. In the case of an event triggering both tests, typically the direction test will be implemented first in a similar manner to the original scanning process of FIG. 7.

It will also be appreciated that in the case of a scheduled event, such as when the digital TV receiver is also a video recorder and can turn on at a scheduled time, the digital TV receiver can detect whether the connected TV is currently on (i.e. if the receiver is being used to view the channel at the time); if not, then in a predetermined period prior to recording the scheduled programme, the digital TV receiver can in principle perform, for the specific channel, a full direction and gain test as per the scanning process of FIG. 7, as the user will not be affected. This will ensure the best reception for the recorded programme, in the user's absence.

Similarly, where the digital TV receiver and the smart antenna are operable to receive a second channel simultaneously (e.g. where the digital TV receiver has two tuners and the smart antenna can apply two sets of phase delays to parallel copies of the received signal to receive from two directions), then the digital TV receiver can similarly perform a re-evaluation process for channels that are not currently being viewed. As noted above, because this does not affect current viewing, such re-evaluation can encompass more than just the current and adjacent directions for a respective channel. Typically, the digital TV receiver may re-evaluate the channels adjacent to the currently viewed channels and also any channels marked as favorites (if this facility exists) on the basis that these are the most likely to be subsequently viewed by a user.

Figure 13:
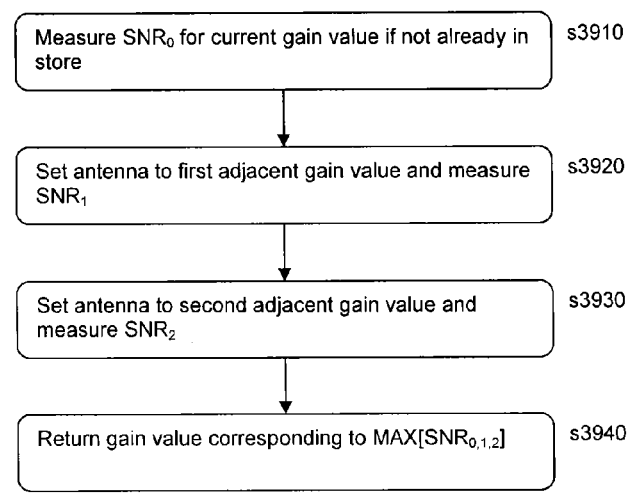
FIG. 13 is a flow diagram of a gain tracking process in accordance with an embodiment of the present invention.

Referring now to FIG. 13, a tracking gain test in accordance with an embodiment of the present invention comprises the following steps.

In a first step s3910, if the SNR value for the current configuration $SNR_0$ is not already stored in memory, then is it measured (i.e. for the original gain value).

In a second step s3920, the first adjacent gain value is selected and the smart antenna is updated. The SNR for the updated configuration $SNR_1$ is then measured. For an original gain value of 0, the adjacent value is 1. For an original gain value of 3, the adjacent value is 2.

In an optional third step s3930, if the original gain value was 1 or 2, then a second adjacent gain value is also available and is selected, and the smart antenna is updated again. The SNR for the second updated configuration $SNR_2$ is then measured.

In a fourth step s3940, the largest measured SNR is detected and the corresponding gain value is returned to the tracking process as the new gain value for the smart antenna configuration.

Figure 14A:
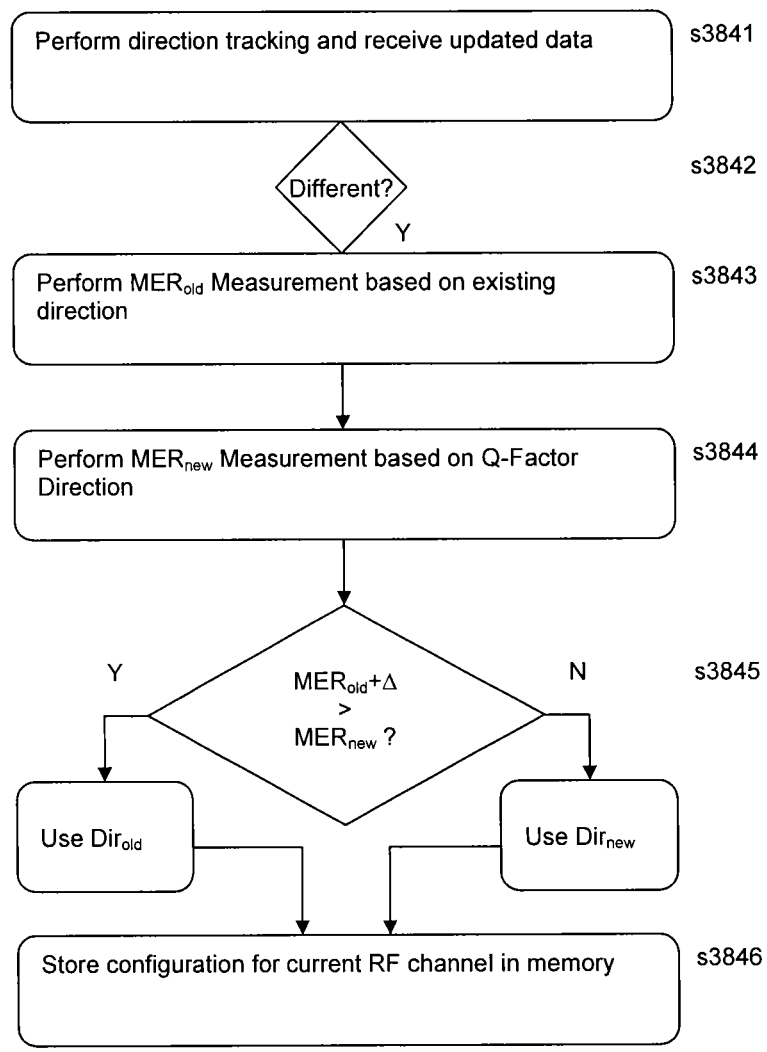
FIG. 14A is a flow diagram of a directional testing process in accordance with an embodiment of the present invention.

Referring to FIG. 14A, in an embodiment of the present invention the fourth step s3850 of FIG. 12 (directional testing) comprises the following sub-steps.

At step s3841, a direction tracking function is called (see reference to FIG. 14B below). Then at step s3842, if the tracking function indicates that a different direction may be preferable to the current direction, then at steps s3843 and s3844, MER measurements for the current direction ($MER_{old}$) and the direction indicated by the direction tracking function ($MER_{new}$) are obtained. Then at step s3845, these MER measurements are compared, with a small bias Δ favoring the existing direction. This bias is typically in the order of 0.1 to 0.5 dB. On the basis of this comparison, either the old or new direction are stored at step s3846 in the current channel memory.

Optionally, if the directional testing is running for the first time (or after a predefined interval between triggering events), then the above process can be repeated after a short predefined interval (for example 30 seconds) to take account of the possibility that a transient event (such as a person moving in the room, or a passing vehicle) affected the previous set of results. In this case, optionally the most favourable direction out of the two separate testing runs (based upon the above described MER comparisons) may be selected.

Finally, optionally if either the system indicates poor reception at the current reception direction, or the directional testing indicates poor reception at both current and adjacent directions to the current direction—for example if the antenna has fallen over—then optionally a coarse direction test may be performed on a wider range of directions, and optionally all directions, in an attempt to find an acceptable reception direction.

Figure 14B:
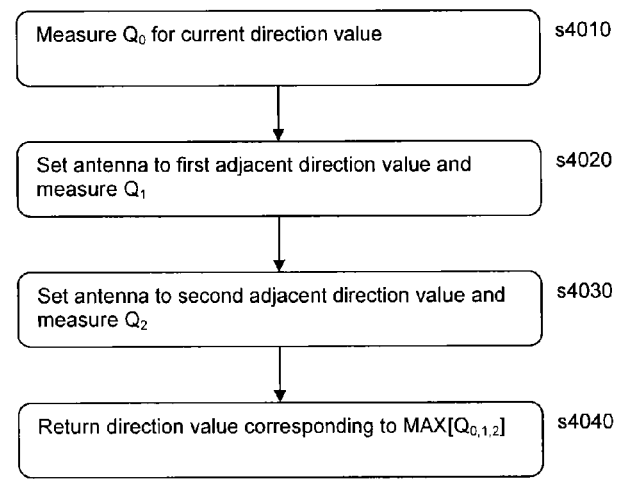
FIG. 14B is a flow diagram of a direction tracking process in accordance with an embodiment of the present invention.

Referring now to FIG. 14B, a tracking direction test in accordance with an embodiment of the present invention comprises the following steps.

In a first step s4010, the Q-factor value for the current configuration $Q_0$ is measured (i.e. for the original smart antenna direction value) as described previously herein.

In a second step s4020, the first adjacent direction value is selected and the smart antenna is updated. The Q-factor for the updated configuration $Q_1$ is then measured. Hence, for example, if the original antenna direction value had been [0, 0], then the first adjacent direction value may be [3, 3].

In a third step s4030, the second adjacent direction value is selected and the smart antenna is updated. The Q-factor for the updated configuration $Q_2$ is then measured. In the current example, the second adjacent direction value would be [0, 1].

Optionally, the Q-factor for each direction may be measured a plurality of times and averaged. The interval between such measurements may be one ranging from between consecutive signal frames (i.e. consecutive CIR evaluations) to an order of several seconds or even minutes. The purpose is to mitigate for any ongoing (short-term) variations in the multipath conditions for that channel during the evaluation process.

Then, in a fourth step s4040, the direction value associated with the largest Q-factor (or average Q-factor) is returned to the tracking process as the new direction value for the smart antenna configuration.

Hence the tracking process of FIG. 12 is able to track drifts in the preferred direction and gain of a smart antenna during normal use of the digital TV receiver, whilst advantageously limiting the visible effect of such tracking for the user.

It will be appreciated therefore that, in a summary embodiment of the present invention, a method of evaluating a quality value with which a television signal is received comprises obtaining an estimate of an impulse response of a channel through which the television signal has passed to a receiver (s3510), finding a maximum value of the channel impulse response, the maximum value corresponding (or assumed to correspond) to a main signal path (s3520), calculating a mean of values of the channel impulse response comprising channel impulse response values corresponding to one or more additional signal paths (s3530), and calculating the quality value as the ratio of the maximum value to the mean of values of the channel impulse response (s3540). Typically, the channel impulse response is obtained from a channel equalization process associated with reception of the signal.

Using the above method, a smart antenna configuration process for a predetermined channel comprises initializing a smart antenna to receive signals from one of a plurality of available directions (s3310), evaluating signal reception at that direction (using the above method) (s3330), storing the quality value in association with that direction, and repeating this for some or all of the available directions (s3350). As a precaution however, evaluation of signal reception for a particular direction may not be performed if the receiver cannot achieve demodulation lock on the signal (s3320).

The configuration process can then either select the direction having the largest quality value, and configuring the smart antenna accordingly; or evaluate an RF signal strength for each of the plurality of available directions (s3340), store the respective RF signal strength in association with each direction, and for the direction associated with the largest quality value and for the direction associated with the largest RF signal strength, evaluate a common reception performance metric (s3230, s3250), and select the direction evaluated to have the best reception performance by the common reception performance metric, before configuring the smart antenna accordingly (s3280). Optionally, selection of the direction evaluated to have the best reception performance by the common reception performance metric is biased in favour of the direction associated with the largest quality value by a predetermined bias amount (s3260).

In addition to evaluating the direction, the above process can also configure the gain by configuring the smart antenna to use the selected direction and the lowest of a predetermined set of gain values (s3410), and; estimating the signal to noise ratio for the configuration (s3430), storing the signal to noise ratio in association with the gain value, repeating the configuration, estimation and storage steps for each subsequent gain value in the predetermined set of gain values (s3440), and then selecting the gain value associated with the largest signal to noise ratio (s3450).

In some embodiments, the process is performed for a smart antenna that is configured in accordance with a CEA-909 standard.

To implement the above process, a smart antenna configuration estimator (125) for use in a digital TV receiver (1000), comprises data input means (such as a data link and input memory buffer or the like) operable to obtain an estimate of a channel impulse response from the receiver, maximum finding means (such as a CPU or dedicated hardware) operable to find the maximum value of the CIR comprising (or assumed to comprise) a response to a main signal path, averaging means (again a CPU or dedicated hardware) operable to calculate a mean of values of the CIR comprising responses to one or more additional signal paths, and ratio calculating means (again a CPU or dedicated hardware) operable to calculate a quality value as the ratio of the maximum to the mean.

Consequently, A digital television receiver can comprise a smart antenna signalling means (127) operable to send to a smart antenna (1010) configuration data specifying one of a plurality of reception directions available to the smart antenna, a smart antenna configuration estimator such as that described above, and a memory operable to store a quality value in association with the specified reception direction, and the digital television receiver is operable for a predetermined RF channel to instruct the smart antenna signalling means to specify in turn some or all of the reception directions available to the smart antenna and to instruct the smart antenna configuration estimator to evaluate a quality value for each respective direction.

Given these facilities, the digital television receiver can then select (for future reception of signals on the predetermined RF channel) the reception direction associated with the largest quality value. Alternatively, the digital television receiver can comprise a signal evaluation means (CPU, dedicated hardware, or part of an existing receiver chain) operable to estimate a received RF signal strength, and in which the memory is operable to store the estimated RF signal strength in association with the specified reception direction, and reception performance evaluation means (CPU or dedicated hardware) operable, for the direction associated with the largest quality value and for the direction associated with the largest RF signal strength, to evaluate a reception performance, and in which the digital television receiver is operable to select (again for future reception of signals on the predetermined RF channel) the reception direction associated with the best reception performance as evaluated by the common reception performance metric. Optionally, selection of the direction evaluated to have the best reception performance by the common reception performance metric can be biased in favour of the direction associated with the largest quality value by a predetermined bias amount.

Finally, it will be appreciated that the methods disclosed herein may be carried out on conventional hardware suitably adapted as applicable by software instruction or by the inclusion or substitution of dedicated hardware. For example, the event monitor and/or the configuration estimator may be dedicated hardware, or may be implemented wholly or partially in software running on a CPU of the digital TV receiver.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of evaluating a quality value with which a television signal is received, the method comprising:
   obtaining an estimate of an impulse response of a channel through which the television signal has passed to a receiver;
   finding a maximum value of the channel impulse response, the maximum value corresponding to a main signal path;
   calculating a mean of values of the channel impulse response comprising channel impulse response values corresponding to one or more additional signal paths excluding the main signal path; and
   calculating the quality value as the ratio of the maximum value to the calculated mean of values of the channel impulse response corresponding to the one or more additional signal paths excluding the main signal path.

2. The method according to claim 1, wherein the channel impulse response is obtained from a channel equalization process associated with reception of the television signal.

3. A smart antenna configuration process for a predetermined channel, comprising:
   initializing a smart antenna to receive signals from one of a plurality of available directions;
   evaluating a quality value associated with signal reception at the one of the plurality of available directions, said evaluating including:
      obtaining an estimate of an impulse response of the predetermined channel through which a signal has passed to a receiver,
      finding a maximum value of the channel impulse response, the maximum value corresponding to a main signal path,
      calculating a mean of values of the channel impulse response comprising channel impulse response values corresponding to one or more additional signal paths excluding the main signal path, and
      calculating the quality value as the ratio of the maximum value to the calculated mean of values of the channel impulse response corresponding to the one or more additional signal paths excluding the main signal path;
   storing the quality value in association with the one of the plurality of available directions; and
   repeating said initializing, said evaluating, and said storing for some or all of the other available directions.

4. The smart antenna configuration process according to claim 3, wherein said evaluating the quality value associated with signal reception at the one of the plurality of available directions is not performed if the receiver cannot achieve demodulation lock on the signal.

5. The smart antenna configuration process according to claim 3, further comprising selecting an available direction of the plurality having a direction with a largest quality value, and configuring the smart antenna based on the selected available direction having the largest quality value.

6. The smart antenna configuration process according to claim 3, further comprising:
   evaluating an RF signal strength for each of the plurality of available directions;
   storing the respective RF signal strengths in association with each available direction;
   for a first available direction associated with a largest quality value and for a second available direction associated with the largest RF signal strength, evaluating a common reception performance metric; and selecting one of the first and second available directions evaluated to have the best reception performance by the common reception performance metric relative to the other of the first and second available directions, and configuring the smart antenna based on the selected one of the first and second available directions.

7. The smart antenna configuration process according to claim 6, wherein selection of one of the first and second available directions evaluated to have the best reception performance by the common reception performance metric relative to the other of the first and second available directions is biased in favor of the direction associated with the largest quality value by a predetermined bias amount.

8. The smart antenna configuration process according to claim 5, further comprising:
  configuring the smart antenna to use the selected direction, and a lowest of a predetermined set of gain values;
  estimating a signal to noise ratio for the configuration;
  storing the signal to noise ratio in association with the lowest gain value of the predetermined set of gain values;
  repeating said configuring the smart antenna to use the selected direction and the lowest gain value, said estimating the signal to noise ratio, and said storing the signal to noise ratio for each subsequent gain value in the predetermined set of gain values; and
  selecting a gain value associated with a largest signal to noise ratio.

9. The smart antenna configuration process according to claim 5, wherein the configuration of the smart antenna is in accordance with a CEA-909 standard.

10. A non-transitory computer program product comprising instructions that, when executed by a processor, cause the processor to perform the method of claim 1.

11. A smart antenna configuration estimator for use in a digital TV receiver, comprising:
  data input circuitry configured to obtain an estimate of an impulse response of a channel through which a television signal has passed to the digital TV receiver;
  maximum finding circuitry configured to find a maximum value of the channel impulse response, the maximum value corresponding to a main signal path;
  calculation circuitry configured to calculate a mean of values of the channel impulse response comprising channel impulse response values corresponding to one or more additional signal paths excluding the main signal path; and
  ratio calculating circuitry configured to calculate a quality value as the ratio of the maximum value to the calculated mean of values of the channel impulse response corresponding to the one or more additional signal paths excluding the main signal path.

12. A digital television receiver comprising:
  smart antenna signaling circuitry configured to send to a smart antenna configuration data specifying one of a plurality of reception directions available to the smart antenna;
  smart antenna configuration estimator circuitry, said smart antenna configuration estimator circuitry including:
    data input circuitry configured to obtain an estimate of an impulse response of a predetermined RF channel through which a television signal has passed to the digital television receiver,
    maximum finding circuitry configured to find a maximum value of the channel impulse response, the maximum value corresponding to a main signal path,
    calculation circuitry configured to calculate a mean of values of the channel impulse response comprising channel impulse response values corresponding to one or more additional signal paths excluding the main signal path, and
    ratio calculating circuitry configured to calculate a quality value as the ratio of the maximum value to the calculated mean of values of the channel impulse response corresponding to the one or more additional signal paths excluding the main signal path; and
  memory circuitry configured to store the quality value in association with the one of the plurality of available reception directions,
  wherein the digital television receiver is operable, for the predetermined RF channel, to instruct the smart antenna signaling circuitry to specify, in turn, some or all of the reception directions available to the smart antenna, and to instruct the smart antenna configuration estimator circuitry to evaluate a quality value for each of the some or all available reception directions.

13. The digital television receiver according to claim 12, wherein the digital television receiver is operable to select, for future reception of signals on the predetermined RF channel, a first available reception direction associated with a largest quality value.

14. The digital television receiver according to claim 13, further comprising:
  signal evaluation circuitry configured to estimate a received RF signal strength, wherein the memory circuitry is operable to store the estimated RF signal strength in association with each corresponding available reception direction; and
  reception performance evaluation circuitry configured to, for the first available reception direction associated with the largest quality value and for a second available reception direction associated with a largest RF signal strength, evaluate a reception performance, wherein the digital television receiver is operable to select for future reception of signals on the predetermined RF channel one of the first and second available reception directions associated with the best reception performance as evaluated by the common reception performance metric.

15. The digital television receiver according to claim 14, wherein the selection of the available reception direction evaluated to have the best reception performance by the common reception performance metric is biased in favor of the direction associated with the largest quality value by a predetermined bias amount.

* * * * *